United States Patent
Gimza et al.

(10) Patent No.: US 11,368,371 B2
(45) Date of Patent: *Jun. 21, 2022

(54) UTILIZING IMAGES TO EVALUATE THE STATUS OF A NETWORK SYSTEM

(71) Applicant: Ciena Corporation, Hanover, MD (US)

(72) Inventors: Marek Gimza, Peachtree Corners, GA (US); Aung Htay, Alpharetta, GA (US); Paul Hudgins, Roswell, GA (US); Hari Pabbati, Cumming, GA (US)

(73) Assignee: Ciena Corporation, Hanover, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 17/464,981

(22) Filed: Sep. 2, 2021

(65) Prior Publication Data
US 2022/0060387 A1 Feb. 24, 2022

Related U.S. Application Data

(63) Continuation of application No. 16/866,932, filed on May 5, 2020, now Pat. No. 11,128,539.

(51) Int. Cl.
*G06F 15/173* (2006.01)
*H04L 41/14* (2022.01)
*G06N 20/00* (2019.01)
*H04L 41/00* (2022.01)
*H04L 41/22* (2022.01)
*H04L 41/16* (2022.01)

(52) U.S. Cl.
CPC .............. *H04L 41/14* (2013.01); *G06N 20/00* (2019.01); *H04L 41/16* (2013.01); *H04L 41/22* (2013.01); *H04L 41/24* (2013.01)

(58) Field of Classification Search
CPC ...................................................... H04L 65/08
See application file for complete search history.

(56) References Cited

U.S. PATENT DOCUMENTS

| 8,887,991 | B2 | 11/2014 | Htay et al. | |
|---|---|---|---|---|
| 9,503,228 | B2 | 11/2016 | Subhedar et al. | |
| 9,614,743 | B2 | 4/2017 | Htay et al. | |
| 9,628,340 | B2 | 4/2017 | Blair | |
| 10,438,207 | B2 | 10/2019 | Subhedar et al. | |
| 2015/0271043 | A1 | 9/2015 | Htay et al. | |
| 2016/0090105 | A1* | 3/2016 | Neubecker | B60W 40/02 701/1 |
| 2016/0212623 | A1 | 7/2016 | Cote et al. | |
| 2016/0380843 | A1* | 12/2016 | Duncan | G06F 3/04842 715/736 |
| 2017/0104635 | A1 | 4/2017 | Htay et al. | |
| 2017/0205783 | A1* | 7/2017 | Tannenbaum | G05B 15/02 |
| 2019/0128743 | A1 | 5/2019 | Dingman et al. | |

(Continued)

*Primary Examiner* — Quang N Nguyen
(74) *Attorney, Agent, or Firm* — Clements Bernard Baratta; Lawrence A. Baratta, Jr.; Christopher L. Bernard (57) ABSTRACT

Systems and methods include receiving visual representations of components in network elements in a network; responsive to training a machine learning model to evaluate the visual representations, analyzing the visual representations using the machine learning model to determine a status of the components; and providing the status of the components to an inventory application for any of updating the inventory application and reconciling existing data in the inventory application.

18 Claims, 4 Drawing Sheets

(56) References Cited

U.S. PATENT DOCUMENTS

| | | |
|---|---|---|
| 2019/0272497 A1* | 9/2019 | Tingler .................. G07G 1/009 |
| 2019/0311552 A1 | 10/2019 | Zhang et al. |
| 2019/0379589 A1 | 12/2019 | Ryan et al. |
| 2020/0167734 A1 | 5/2020 | Hoofard et al. |
| 2020/0175971 A1 | 6/2020 | Arora et al. |
| 2021/0022027 A1 | 1/2021 | Khoshgard |
| 2021/0027485 A1 | 1/2021 | Zhang |
| 2021/0103759 A1* | 4/2021 | Chai .................... G06V 10/462 |
| 2021/0160125 A1 | 5/2021 | Cheng |
| 2021/0206515 A1 | 7/2021 | Stefanowski et al. |
| 2021/0345133 A1* | 11/2021 | Li ........................ H04W 24/02 |

* cited by examiner

```
# one-time initialization during server start up to
# get the same transform as during training
trn_tfms, val_tfms = tfms_from_model(arch, sz)

@app.route('/filler', methods=["GET","POST"])
async def filler(request):
    body = await request.form()
    binary_data = a2b_base64(body['imgBase64'])
    # use validation transform on the decoded image
    img = tfm_image(BytesIO(binary_data), val_tfms)
    preds = learner.predict_array(img[None])
    analysis = { "predictions": preds}
    return JSONResponse(analysis)
```

UTILIZING IMAGES TO EVALUATE THE STATUS OF A NETWORK SYSTEM

CROSS-REFERENCE

The present disclosure is a continuation of U.S. patent application Ser. No. 16/866,932, filed May 5, 2020, now U.S. Pat. No. 11,128,539 issued Sep. 21, 2021, the contents of which are incorporated by reference in their entirety.

TECHNICAL FIELD

The present disclosure generally relates to systems and methods for monitoring network equipment. More particularly, the present disclosure relates to obtaining images of network elements of a network system from an external source and processing these images, such as by using Machine Learning (ML), to evaluate the status of the network system.

BACKGROUND

In the field of telecommunications, inventory software is used to track and analyze the inventory (e.g., network elements, nodes, switches, routers, etc.) of a networking system. Normally, the inventory software may be used with Operations, Administration, and Maintenance (OAM) processes. Generally, inventory information can be updated to reflect changes in the network. Telecommunication equipment inventory is collected via "management" interfaces directly from hardware components of the network. Software application solutions can be configured to communicate with the network hardware, such as shelves and cards of network elements or nodes, to build the inventory content.

However, conventional inventory applications may suffer from certain shortcomings. For example, in many cases, inventory applications may rely on the network itself to communicate inventory information and thus the hardware components must be running or operational (e.g., connected to electricity and turned on). Another shortcoming is that the hardware's management interface must also be operational (e.g., properly configured, enabled, and reachable). Also, in conventional systems, a communications channel from the management interface to the inventory application must be operational (e.g., including authentication and authorization aspects of establishing the connection over the communications channel). Extended periods of downtime (e.g., when any of the above aspects are non-operational) may result in stale and possibly incorrect inventory information. Another shortcoming of conventional inventory applications is that each vendor's hardware (and sometimes hardware from the same vendor) may have a different management interface, protocol, and abstract models (e.g., Termination Point Encapsulation (TPE)/Forwarding Relationship Encapsulation (FRE), Telecommunications Application Programming Interface (TAPI), OpenConfig etc.) such that normalizing software behavior over a broad scope of variance may require a very complex solution. Therefore, there is a need in the field of inventory applications, particularly in networking systems, to overcome the above-mentioned shortcomings and provide other benefits for evaluating the status of components within a system with little or no human involvement.

BRIEF SUMMARY

According to one implementation of the present disclosure, a monitoring system may be configured to include a processing device and a memory device configured to store an inventory evaluation module having logical instructions. When executed, the logical instructions are configured to cause the processing device to obtain one or more visual representations of one or more components of a network system. Responsive to training a Machine Learning (ML) model to evaluate the one or more components of the network system, the logical instructions are further configured to analyze the one or more visual representations using the ML model for evaluating a status of the one or more components of the network system.

According to another implementation, a non-transitory computer-readable medium may be configured to store computer logic having instructions that, when executed, cause one or more processing devices to obtain one or more visual representations of one or more components of a network system. Responsive to training a ML model to evaluate the one or more components, the instructions also cause the one or more processing devices to analyze the one or more visual representations using the ML model for evaluating a status of the one or more components of the network system.

According to yet another implementation, a method may include the step of obtaining one or more visual representations of one or more components of a network system. Responsive to training a ML model to evaluate the one or more components of the network system, the method may also include the step of analyzing the one or more visual representations using the ML model for evaluating a status of the one or more components of the system.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

The present disclosure relates to systems and methods for evaluating inventory (e.g., components) integrated within a network system. In a network environment, the evaluating systems may be configured to monitor nodes or network elements within a telecommunications system, where each node or network element may include multiple sub-units that may be operational units or non-operational (e.g., filler) units. In particular, the evaluating or monitoring may include capturing images or other visual representations of the sub-units of each node, which may further include capturing these images from a perspective that is independent of the actual node itself.

The images may be collected and analyzed to determine various status information about the nodes of the system. For example, the status information may include determining if an operational sub-unit is present within a node or if a temporary "filler" sub-unit, which may not necessarily include operational functionality, has been placed in a slot where operational sub-units can be placed when needed. The status information, according to another example, may include an illumination or a presentation of a specific color of a Light Emitting Diode (LED) or other visual indicator located on the node itself and designed to show a user that a certain condition is present or a certain threshold is reached in one or more of the sub-units of the node.

At a high-level, the present disclosure may be configured to receive image information from existing location-based sensors (e.g., data center security cameras) to derive dynamic inventory information through object recognition via computer vision intelligence algorithms. The systems and methods of the present disclosure may require no new or retrofitted hardware and can work across multi-vendor equipment. Inventory data is retrieved, reconciled, and delivered in real time.

More specifically, the present disclosure may include a Machine Learning (ML) system that gathers computerized vision data of network elements in a data center with the purpose to identify the inventory on those network elements, as well as the status of the components of the network elements in the data center, and the services they support. The present systems and methods may provide a digitized visual representation of the data center's network elements without any human intervention. With this ability, certain manual tasks of the Operations, Administration, and Management (OAM) functions become redundant.

Typical network element inventory may comprise Field Replaceable Units, Fan Units, Controller cards, Filler cards, and a variety of Traffic Carrying Port cards supporting services with different traffic rates. Each network element type has its own set of characteristics (e.g., dimensions, design, etc.) and LEDs which are typically used to convey some level of status information. Hence, with a digitized visual representation of these units, the Machine Learning (ML) system will provide up-to-date inventory information supporting the network services within a data center.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present disclosure. Additional aspects and advantages of the present disclosure will be apparent from the following detailed description of exemplary embodiments which are illustrated in the accompanying drawings.

Status Evaluating Systems and Methods

Figure 1:
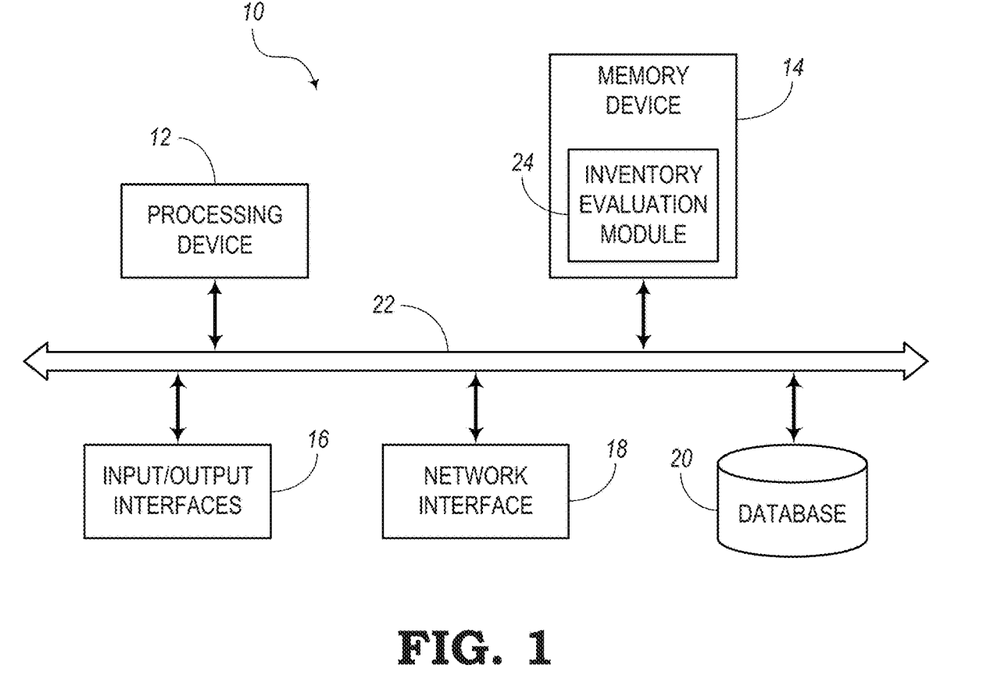
FIG. 1 is a block diagram illustrating a monitoring device for remotely receiving images of a system being monitored and processing the images to determine the status of various components of the system, according to various embodiments of the present disclosure.

FIG. 1 is a block diagram illustrating an embodiment of a monitoring device 10 for remotely receiving images of a system being monitored and processing the images to determine the status of various components of the system. In the illustrated embodiment, the monitoring device 10 may be a digital computer that, in terms of hardware architecture, generally includes a processing device 12, a memory device 14, Input/Output (I/O) interfaces 16, a network interface 18, and a database 20. The memory device 14 may include a data store, database (e.g., database 20), or the like. It should be appreciated by those of ordinary skill in the art that FIG. 1 depicts the monitoring device 10 in a simplified manner, where practical embodiments may include additional components and suitably configured processing logic to support known or conventional operating features that are not described in detail herein. The components (i.e., 12, 14, 16, 18, 20) are communicatively coupled via a local interface 22. The local interface 22 may be, for example, but not limited to, one or more buses or other wired or wireless connections. The local interface 22 may have additional elements, which are omitted for simplicity, such as controllers, buffers, caches, drivers, repeaters, receivers, among other elements, to enable communications. Further, the local interface 22 may include address, control, and/or data connections to enable appropriate communications among the components 12, 14, 16, 18, 20.

The processing device 12 is a hardware device adapted for at least executing software instructions. The processing device 12 may be any custom made or commercially available processor, a Central Processing Unit (CPU), an auxiliary processor among several processors associated with the monitoring device 10, a semiconductor-based microprocessor (in the form of a microchip or chip set), or generally any device for executing software instructions. When the monitoring device 10 is in operation, the processing device 12 may be configured to execute software stored within the memory device 14, to communicate data to and from the memory device 14, and to generally control operations of the monitoring device 10 pursuant to the software instructions.

It will be appreciated that some embodiments of the processing device 12 described herein may include one or more generic or specialized processors (e.g., microprocessors, Central Processing Units (CPUs), Digital Signal Processors (DSPs), Network Processors (NPs), Network Processing Units (NPUs), Graphics Processing Units (GPUs), Field Programmable Gate Arrays (FPGAs), and the like). The processing device 12 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 16 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 16 may include, for example, a serial port, a parallel port, a Small Computer System Interface (SCSI), a Serial Advanced Technology Attachment (SATA), a fiber channel, InfiniBand, Internet SCSI (iSCSI), a PCI Express interface (PCI-x), an InfraRed (IR) interface, a Radio Frequency (RF) interface, and/or a Universal Serial Bus (USB) interface.

The network interface 18 may be used to enable the monitoring device 10 to communicate over a network, the Internet, a Wide Area Network (WAN), a Local Area Network (LAN), and the like. According to the implementations described herein, the network interface 18 may be connected to a control network or management network that works in parallel with a telecommunications network system from which evaluation images are obtained. In this respect, the control network may be configured to communicate on lines, channels, etc. that are separate from and do not overlap with the lines, channels, etc. of the telecommunications network. In some embodiments, the network interface 18 may include, for example, an Ethernet card or adapter or a Wireless Local Area Network (WLAN) card or adapter. The network interface 18 may include address, control, and/or data connections to enable appropriate communications on the control network.

The memory device 14 may include volatile memory elements (e.g., Random Access Memory (RAM, such as DRAM, SRAM, SDRAM, and the like)), nonvolatile memory elements (e.g., ROM, hard drive, tape, CDROM, and the like), and combinations thereof. Moreover, the memory device 14 may incorporate electronic, magnetic, optical, and/or other types of storage media. The memory device 14 may have a distributed architecture, where various components are situated remotely from one another, but can be accessed by the processing device 12. The software in memory device 14 may include one or more software programs, each of which may include an ordered listing of executable instructions for implementing logical functions. The software in the memory device 14 may also include a suitable Operating System (O/S) and one or more computer programs. The O/S essentially controls the execution of other computer programs, and provides scheduling, input-output control, file and data management, memory management, and communication control and related services. The computer programs may be configured to implement the various processes, algorithms, methods, techniques, etc. described herein.

The memory device 14 may include a data store used to store data. In one example, the data store may be located internal to the monitoring device 10 and may include, for example, an internal hard drive connected to the local interface 22 in the monitoring device 10. Additionally, in another embodiment, the data store may be located external to the monitoring device 10 and may include, for example, an external hard drive connected to the I/O interfaces 16 (e.g., SCSI or USB connection). In a further embodiment, the data store may be connected to the monitoring device 10 through a network and may include, for example, a network attached file server.

Moreover, some embodiments may include a non-transitory computer-readable storage medium having computer readable code stored in the memory device 14 for programming the monitoring device 10 or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM), Flash memory, and the like. When stored in the non-transitory computer-readable medium, software can include instructions executable by the processing device 12 that, in response to such execution, cause the processing device 12 to perform a set of operations, steps, methods, processes, algorithms, functions, techniques, etc. as described herein for the various embodiments.

Furthermore, the monitoring device 10 may be configured to include an inventory evaluation module 24, which may be embedded in software and/or firmware and stored in the memory device 14. In other embodiments, the inventory evaluation module 24 may be configured partially or fully in hardware of the processing device 12. The inventory evaluation module 24 may include instructions that, when executed, cause the processing device 12 to perform certain functions.

The inventory evaluation module 24 may be configured to cause the network interface 18 to obtain images or other visual representations from a plurality of components within a system. With respect to the example of a network system being monitored, the inventory evaluation module 24 may be configured to receive images, obtained externally, of nodes or network elements within the network system being monitored. The nodes or network elements may include components, sub-units, etc. arranged on one or more racks, shelves, chassis, etc.

The monitoring device 10 can also work together with existing inventory applications described herein. In an embodiment, the monitoring system 10 can operate as a verification of the data in such inventory applications. The monitoring system 10 can cause a reconciliation with an inventory application based on its evaluation such that the inventory application is updated based on discrepancies between the monitoring system 10 and data in the inventory application.

Figure 2:
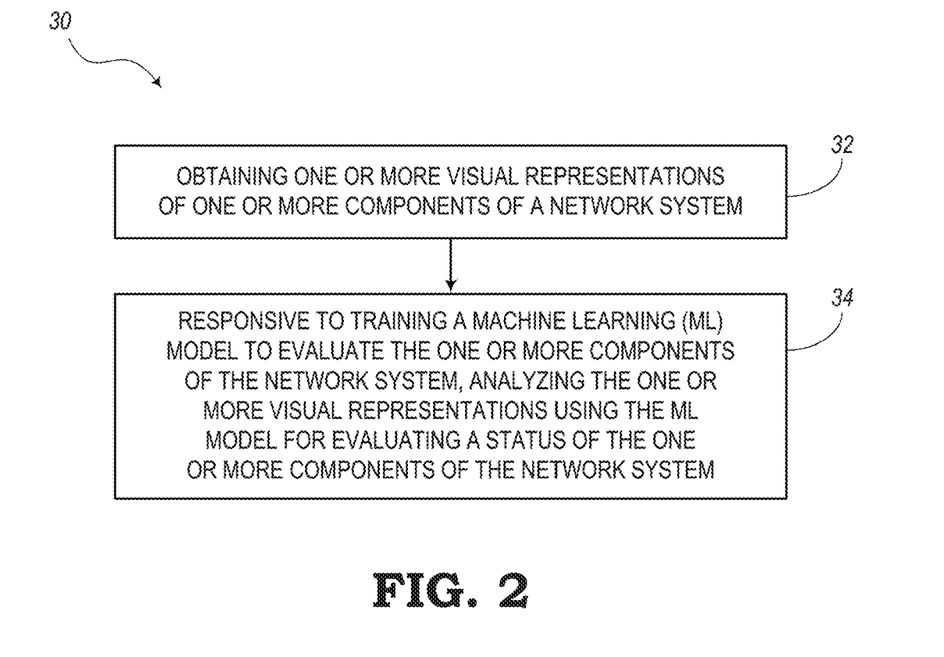
FIG. 2 is a flow diagram illustrating a process related to the inventory evaluation module shown in FIG. 1, according to various embodiments.

FIG. 2 is a flow diagram showing an embodiment of a process 30 for evaluating the status of inventory (e.g., elements, components, etc.) of an overall system, such as a communication network system. In some respects, the process 30 may represent the functions of the inventory evaluation module 24 shown in FIG. 1. The process 30 may include, for example, the step of obtaining one or more visual representations (e.g., images) of one or more components of a network system, as indicated in block 32. Responsive to training a Machine Learning (ML) model to evaluate the one or more components of the network system, the process 30 also includes the step of analyzing the one or more visual representations using the ML model for evaluating a status of the one or more components of the network system, as indicated in block 34.

According to additional embodiments, the process 30 may further comprise the steps of obtaining one or more known visual representations of the one or more components and utilizing the one or more known visual representations for the training of the ML model. The process 30 may be configured whereby the step of evaluating the status may include at least one of: 1) determining an operational status of the one or more components, 2) identifying a physical inventory of the system, and 3) recognizing the presence or absence of one or more sub-units of at least one of the one or more components.

The step of obtaining the one or more visual representations (i.e., block 32) may include the step of capturing images of the one or more components from an observational perspective external to the system. For example, capturing images may include utilizing one or more cameras or video cameras located in a data center with the network system. The process 30 may further comprise the steps of recording location information pertaining to the location of each of the cameras or video cameras while the one or more visual representations are obtained and determining the identity of the one or more components based on the location information.

In some embodiments, the process 30 may be executed automatically on a periodic basis without human intervention. The system being monitored by the status evaluating process 30 may be a data center of a communications network according to some embodiments, and the one or more components may therefore be nodes or network elements. Each of the nodes or network elements may include one or more Field Replaceable Units (FRUs), Power Supply Units (PSUs), pluggable modules ("pluggables"), fans, cards, filler cards, and Light Emitting Diodes (LEDs) indicating status or threshold conditions. The process 30 may further comprise the step of utilizing the ML model to evaluate the status of the nodes or network elements to plan a strategy for allocating future bandwidth capacity.

Furthermore, the process 30 may further be configured to include the step of dynamically retraining the ML model based on changes to the system or based on feedback from a user for the evaluating of the one or more components. The ML process may be configured to use an object recognition process on the one or more visual representations. The process 30 may further include the step of performing an administrative action on the system in response to the evaluation of the status of the one or more components. In some embodiments, the process 30 may also include reconciling a distinct inventory application based on the evaluation of the status by updating data in the distinct inventory application based on any discrepancies with the results from executing the process 30.

Those skilled in the pertinent art will appreciate that various embodiments may be described in terms of logical blocks, modules, circuits, algorithms, steps, and sequences of actions, which may be performed or otherwise controlled with a general purpose processor, a DSP, an Application Specific Integrated Circuit (ASIC), a field programmable gate array, programmable logic devices, discrete gates, transistor logic, discrete hardware components, elements associated with a computing device, or any suitable combination thereof designed to perform or otherwise control the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, those skilled in the pertinent art will appreciate that the various illustrative logical blocks, modules, circuits, algorithms, and steps described in connection with the embodiments described in the present disclosure may be implemented as electronic hardware, computer software, or any suitable combinations thereof. To clearly illustrate this interchangeability of hardware and software, various illustrative components, blocks, modules, circuits, algorithms, and steps have been described herein in terms of their general functionality. Whether such functionality is implemented in hardware or software depends upon the particular application and design constraints, and those skilled in the pertinent art may implement the described functionality in various ways to suit each particular application, but such implementation decisions should not be interpreted as causing a departure from the scope or spirit of the present disclosure. Additionally, the various logical blocks, modules, circuits, algorithms, steps, and sequences of actions described herein can be considered to be embodied entirely within any form of computer readable storage medium having stored therein a corresponding set of computer instructions that upon execution would cause an associated processor to perform the functionality described herein. Thus, the various aspects and embodiments disclosed herein may be embodied in a number of different forms, all of which have been contemplated to be within the scope or spirit of the claimed subject matter. In addition, for each of the embodiments described herein, the corresponding form of any such embodiments may be described herein as, for example, "logic configured to" perform the described action.

The methods, sequences and/or algorithms described in connection with the embodiments disclosed herein may be embodied directly in hardware, in a software module executed by a processor, or any suitable combination thereof. Software modules may reside in memory controllers, DDR memory, RAM, flash memory, ROM, Erasable Programmable ROM (EPROM), Electrically Erasable Programmable ROM (EEPROM), registers, hard disks, removable disks, CD-ROMs, or any other storage medium known in the art or storage medium that may be developed in the future. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal or other computing device. In the alternative, the processor and the storage medium may reside as discrete components in a user terminal or other computing device.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both storage media and communication media, including any medium that facilitates transferring a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage, or other magnetic storage devices or media that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, Digital Subscriber Line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes Compact Disc (CD), laser disc, optical disc, Digital Versatile Disc (DVD), floppy disk and Blu-ray disc where disks usually reproduce data magnetically, while discs reproduce data optically with lasers. Combinations of the above should also be included within the scope of computer-readable media.

Use Case Examples

The examples described below are related to evaluating the status of network components arranged in a network or network system. However, it should be recognized that the embodiments described in the present disclosure may also refer to the evaluating of any type of components within any type of system.

In a network, each network element may include LEDs that may be configured to visually indicate conditions or status information to a user. For example, some LEDs may be illuminated when a certain condition (e.g., power on, power off, currently operating, etc.) is detected in the network element itself. Some LEDs may be used to indicate when a certain parameter goes outside a certain acceptable range or reaches or exceeds a certain threshold (e.g., a voltage level falling below an acceptable level, etc.) These LEDs can be referenced externally (e.g., by viewing the illumination, color, or other factor of the LEDs) to determine the status of the network element. In some embodiments, the viewing of the LEDs can be done from a perspective outside the system being monitored. For example, one or more security cameras in a security network may be used to feed images to the monitoring device 10 to allow the monitoring device 10 to evaluate the status of the various network components without the need for human interaction.

Furthermore, the LEDs on each inventory unit (e.g., fan, card, etc.) may be referenced to determine each individual unit's status. This capability becomes ideal when the management connectivity to a faulty network element is lost. In this case, the external monitoring system can communicate signals without the need for communication signals within the monitored system itself. It is also ideal for those network elements which do not support dying gasp notification to the management system when a fatal system failure occurs.

The inventory evaluation module 24 may include Machine Learning (ML) processes or algorithms for learning how to identify various conditions or statuses. For example, by identifying filler cards (e.g., cards used to fill empty slots in the network element), the ML system can determine how much extra traffic and services can be added to a network element. The ML system can also learn to differentiate between different XFP form pluggable ports and use this information to determine the current network bandwidth, type, and services that the network element can support.

The operating principles of the monitoring device 10 as controlled by the inventory evaluation module 24 will be described below in a series of use cases. Exemplary implementation is done using an open source library (e.g., Fastai, PyTorch, etc.) for Proof of Concept (PoC). It should be noted that the present disclosure, however, is not necessarily tied to these particular libraries.

Use Case 1

The first PoC is for binary classification to determine whether a network element contains at least one "filler" card.

Figure 3A:
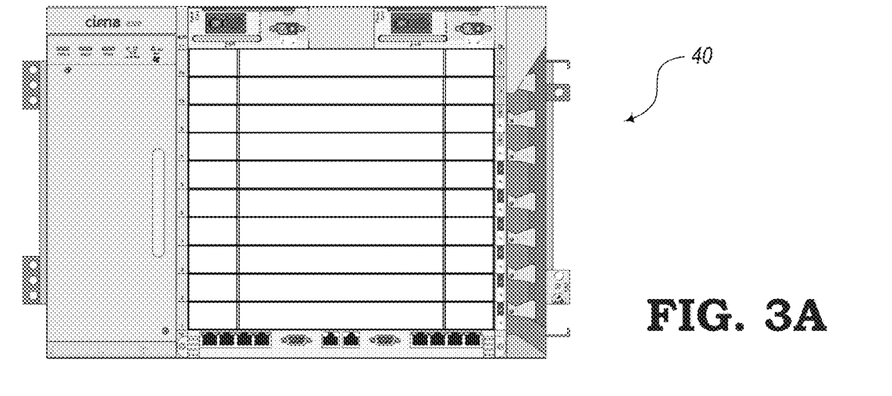
FIG. 3A is a diagram illustrating an example of images of non-operational filler sub-units of components within a system being monitored, according to various embodiments.
Figure 3B:
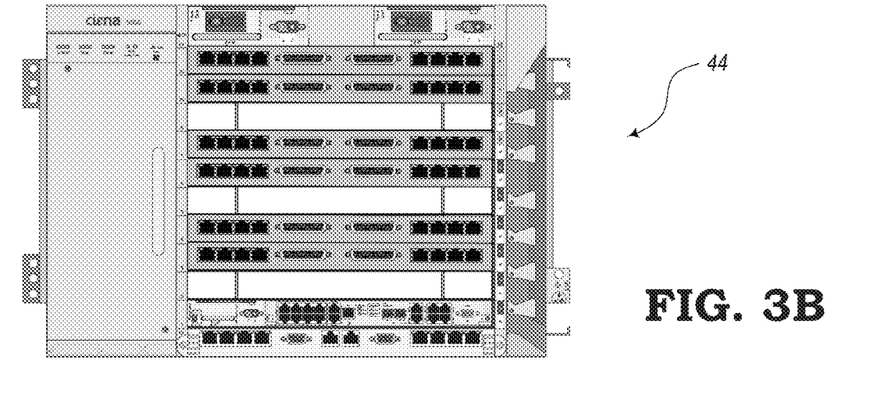
FIG. 3B is a diagram illustrating an example of images of operational sub-units of components within the system being monitored, according to various embodiments.

FIGS. 3A and 3B show examples of "filler" and "no filler" images, respectively. FIG. 3A is a diagram illustrating an example of a component 40 (e.g., network element, node, router, switch, etc.) having non-operational filler sub-units in the slots, where the component 40 is incorporated within a system being monitored. FIG. 3B is a diagram illustrating an example of a component 44 having operational sub-units in the slots, where the component 44 is incorporated within the system being monitored. The components 40, 44 of FIGS. 3A and 3B may be arranged (e.g., without a cover) to allow a camera to capture images of the components 40, 44.

As shown in FIGS. 3A and 3B, the components 40, 44 are shown without a cover to allow a camera to more easily capture the internal filler elements or sub-units thereof. If a human can see the LEDs or the filler cards, then the cameras can capture images that can be used to train the system to recognize various aspects of the components or network elements. Using these particular images, it is possible to achieve 100% accurate in a ML prediction using the present prototype.

The types of cameras are not particularly relevant to the novelty of the present disclosure, but the methods of using the images, as described in the present disclosure, to detect certain conditions or status of the network elements 40 is not addressed in conventional strategies. The images may be captured using security cameras and/or cameras arranged specifically for the purposes described in the present disclosure. In some embodiments, a user may capture images using a mobile device (e.g., cell phone having a camera application).

In a process for training a ML model, images are collected from images that may be captured by external cameras. Other information, such as from internal sources, can also be collected. The images are manually labeled as "filler," "no filler," etc. The intent is to label the new images and apply them to the ML model as part of a ML reconciliation process. The labeled images are organized as follows:

i. Create a directory named "data/filler_no_filler",
  ii. Create two more directories under "data/filler_no_filler" called "train" and "valid",
  iii. Under each of the "train" and "valid" directories, create another two directories called "filler", "no_filler",
  iv. Place the training images under "data/filler_no_filler/train/filler" and "data/filler_no_filler/train/no_filler" respectively, and
  v. Place validation/test images under the "valid" directory.

Figure 4:
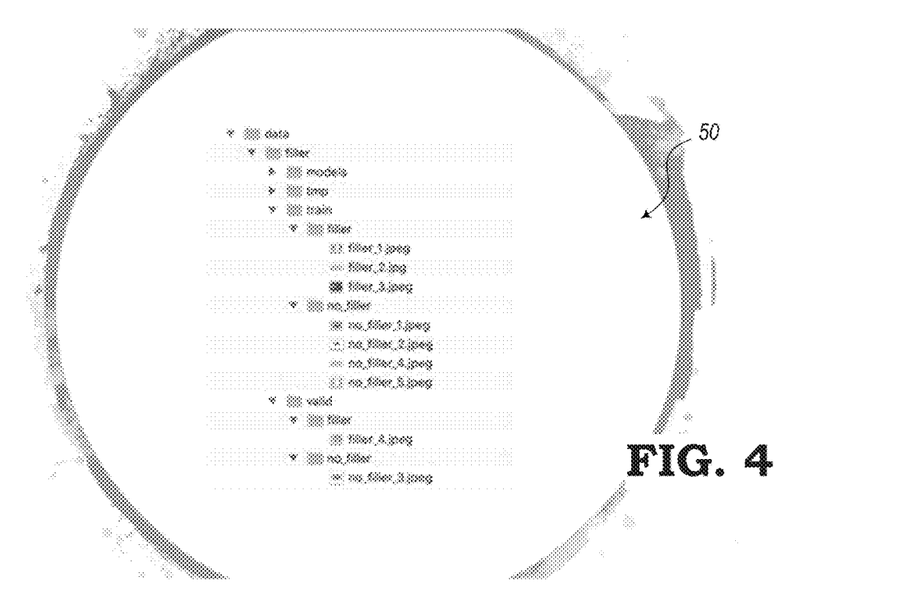
FIG. 4 is a diagram illustrating an example of a directory structure for organizing images, according to various embodiments.

FIG. 4 is a diagram illustrating an example of a directory structure 50 for organizing images. The example starts with a pre-trained Residual Network (ResNet) model, such as the ResNet-34 model, which is based on arxiv.org/abs/1512.03385. Its library allows a model creator to replace the final layers with a custom head which is comprised of his or her own layers. The rest of the layers are frozen such that the parameters are not updated during the initial training. The data augmentation is required and hence the pretrained model must be unfrozen to tune the parameters using "stochastic gradient descent with restarts" (SGDR).

Even with a relatively small data set, it is possible to "train" the system into a very good model (very high percentage of accuracy 1.0=100%). In practice, more images would be trained, including images from the sources such as security cameras from different data centers. With this use case, one of ordinary skill in the art will be able to see how the shortcomings of conventional systems could be overcome such that they will no longer be an issue with the present disclosure.

Figure 5:
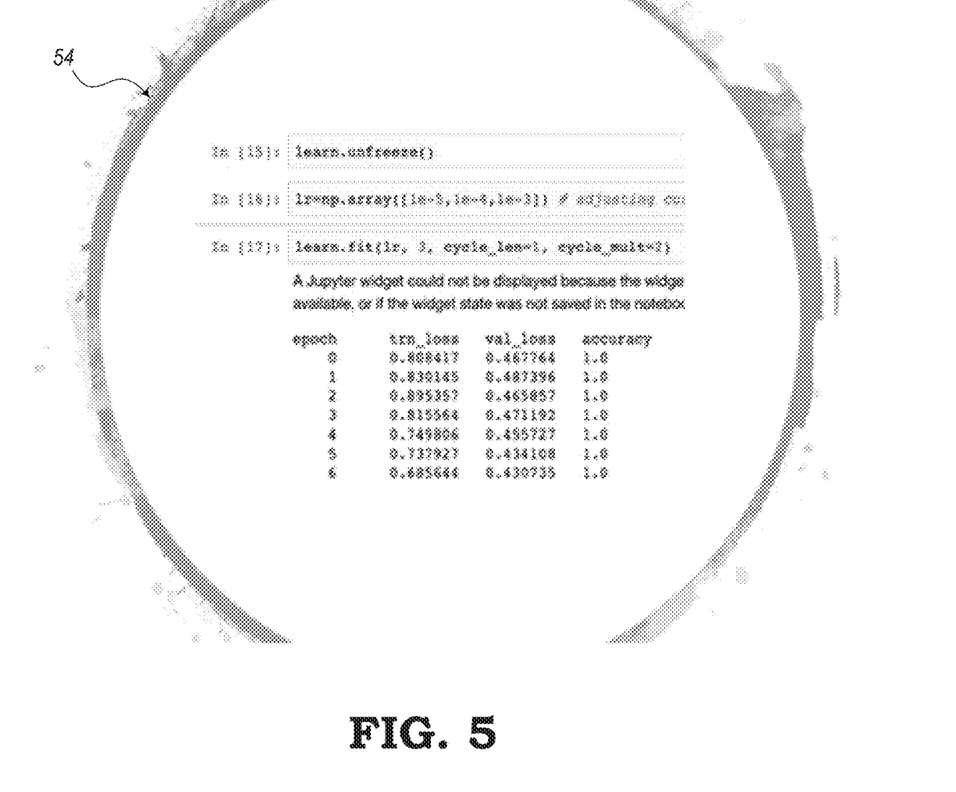
FIG. 5 is a diagram illustrating an example of fine-tuning a Machine Learning (ML) model, according to various embodiments.

FIG. 5 is a diagram illustrating an example of fine-tuning a Machine Learning (ML) model 54. In a deployment stage, the trained model may be instantiated/deployed on a Representational State Transfer (REST) server (e.g., Starlette code fragment). The images to be identified are presented to the model 54 and the predictions are obtained.

Image data streams can also be obtained from a webRTC to capture frames from different camera video streams. The individual frames can then be base64 encoded and sent to the server as REST requests. The REST server retrieves the image data from the request body and uses the machine learning model to predict. A json response is sent back containing the predictions.

Figure 6:
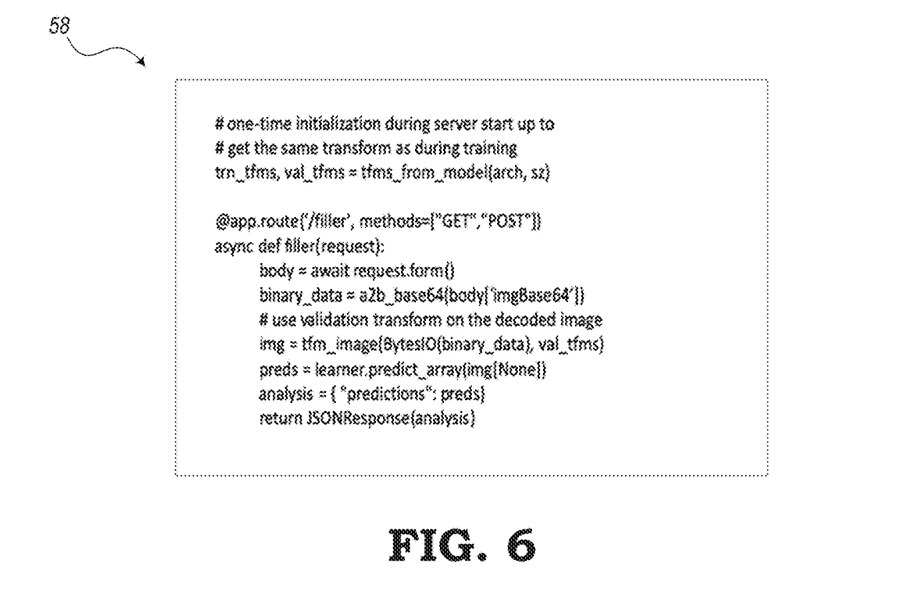
FIG. 6 is a diagram illustrating an example of a fragment of code of the inventory evaluation module shown in FIG. 1, according to various embodiments.
Figure 7:
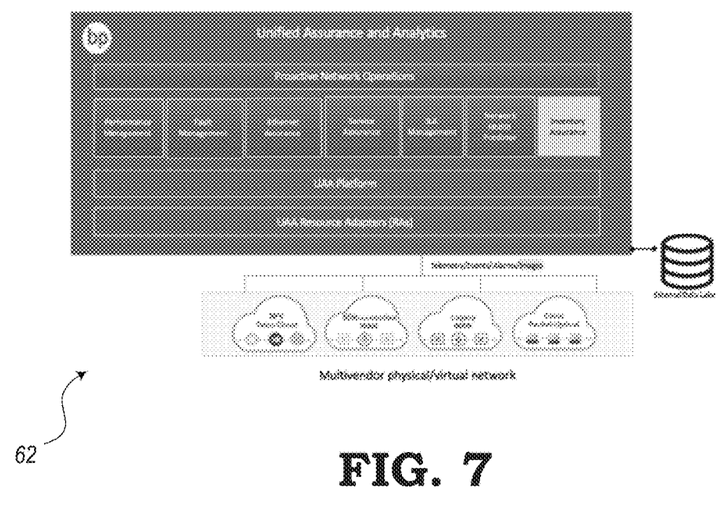
FIG. 7 is a diagram illustrating an example of a deployment of software having unified assurance and analytics, according to various embodiments.

FIG. 6 is a diagram illustrating an example of a fragment of code 58 of the inventory evaluation module 24 shown in FIG. 1. FIG. 7 is a diagram illustrating an example 62 of a deployment of software having unified assurance and analytics. Reconciliation (e.g., Self-Supervised Learning) may be incorporated into an inventory program used as part of a feedback loop to label the images depicting the federated inventory data. These images are used to train the model as a "pretext task."

Use Case 2

Figure 8A:
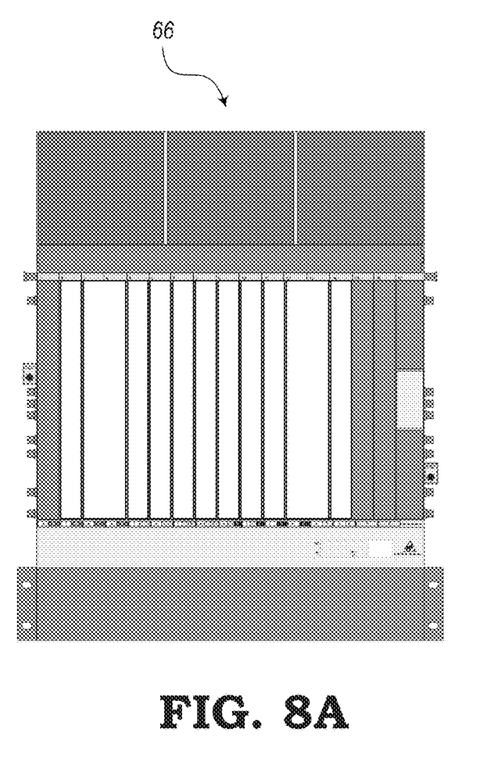
FIG. 8A is a diagram illustrating an example of images of non-operational filler sub-units of components within a system being monitored, according to various embodiments.
Figure 8B:
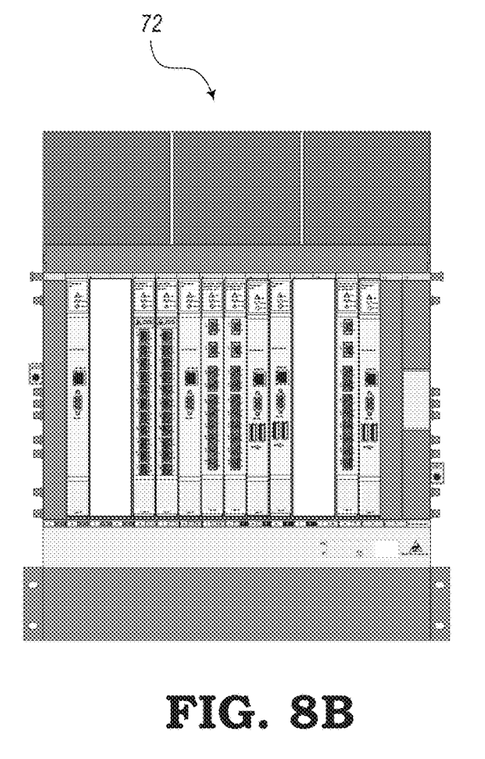
FIG. 8B is a diagram illustrating an example of images of operational sub-units of components within the system being monitored, according to various embodiments.

The second PoC is for binary classification of whether a multi-vendor shelf contains at least one "filler" card. FIG. 8A is a diagram illustrating an example of a network element 66 from which images can be obtained. The network element 66 may be configured with non-operational filler sub-units in the slots. The component or network element 66 may be integrated within a system being monitored. FIG. 8B is a diagram illustrating an example of a component 72 from which images can be obtained. The component 72 may include operational sub-units in the slots. The component 72 may be integrated within the system being monitored.

Use Case 3

Another example, which may be represented by FIG. 8B, includes a multi-classification of sub-units or components within a system being monitored. This third use case is for multi-label classification. In the use cases above, a single label classification (i.e., filler/no-filler) is employed. With multi-label classification, each sample can belong to one or more categories. The potential labels can be "AC-PSU FAN-FRU Power-off" to specify the AC powered FAN Field Replaceable Unit that is powered off, and "DC-PSU Power-on FAN-absent" to specify the absence of the FAN unit.

Use Case 4

In this use case, object detection using bounding boxes is used. An example algorithm is the RetinaNet as described in arxiv.org/abs/1708.02002. Using such an algorithm, the present disclosure will be able to give precise prescribed close loop actions such as "insert new XXX card in Shelf A, Slot 3 after removing the Filler card." FIG. 8B may also represent an example of images of filler and non-filler sub-units or components within a system being monitored. The sub-units may include bounding boxes around filler cards and field replaceable power supply units.

Other Use Cases

The present disclosure may use an imaging system to perform "inventory analysis" of data communication and telecommunication equipment. The ML algorithms may use any reasonable features of the images such that anything useful can be inferred from the images. For example, if a camera is arranged to capture images of a rack of equipment of a node or network element within a network system, the ML algorithms can utilize the image data to be able to identify a circuit packs, for instance, while many others may be hidden from view. In this case, an operator may not even know if they are not missing any cards, are missing a few cards, or missing nearly all the cards.

The present disclosure defines a ML system for self-learning and reconciliation on images of network elements at a data center. The imaging system is just an input source to independently collect image information. In fact, imaging is not necessarily the only way to collect information. It can augment the feature set of such inventory system, but does not necessarily need to replace any existing mechanisms.

At present, security cameras may represent an example of how to get those images. It may be up to the user (or service provider) to appropriately set the cameras up to collect the images of their network elements at the data center. The more images collected, the better the self-learning and reconciliation of the system under test.

The examples and user cases in the present disclosure show that the systems/methods can work, even when the inventory is only partially visible. Furthermore, the present disclosure may include many possible uses of collated image data that can be obtained. Inventory reconciliation is one use that depends on the accuracy and completeness of the image coverage.

A video feed may be able to cover all angles of the network equipment since certain things (e.g., LEDs) might not be able to be read from all angles. Computer vision has advanced in recent years such that if a human can "see" the LED, it is possible to train a ML model to do the same. In some cases, for example, a direct line of sight is not required.

With an independent channel (e.g., images, video, etc.) of information collection, the systems described herein can apply ML technologies or other Artificial Intelligence (AI) on that data and use it in an advantageous manner. Data augmentation can be used (aug_tfms=transforms_side_on), where images may be randomly rotated, the image lighting randomly changed, and randomly flipped to train the model. For example:

transforms_basic=[RandomRotate(10),Random
       Lighting(0.05, 0.05)]

transforms_side_on=transforms_basic+
       [RandomFlip( )]

Depending on the setup, other forms of augmentation can be performed. For example:
    class Random Dihedral(CoordTransform):
In some embodiment, the images may be rotated by random multiples of 90 degrees and/or may be reflected.

An intent of the present disclosure is to provide a system that uses ML technology to pick up images from a data center, which may include nodes, switches, routers, etc., where it is possible from a visual line of sight (e.g., from one or more cameras) to be able to see the LEDs on that node. Also, the cameras may see the different types of cards, the ports on those cards, or any physical inventory that is visible on that node. The image data obtained from these cameras may be stored in the memory device 14 or database 20. The processing device 12 is configured to process the image data through an ML system, whereby a ML algorithm may be stored in the memory device 14. The image data may be processed either locally on a server somewhere in the data center or somewhere else at a remote location. As such, it is possible to monitor the status of the node when things go wrong, such as if that node cannot be connected or accessed using conventional means, such as Simple Network Management Protocol (SNMP), Transmission Control Protocol (TCP), etc.

A second application of the monitoring device 10 and/or system that monitors one or more components of a system may include capturing images. In such an application, the inventory evaluation module 24 may be configured to predict failures on the system before they actually occur.

Thirdly, in terms of operations and management functionality, the inventory evaluation module 24 may be configured to see what services that node is providing. Since some different nodes may be arranged with certain "non-operational" or empty components, which may be referred to as "filler cards," as well as physical ports or XFPs that are already plugged into that card on the node, the systems described herein may be configured to give an indication to an operator remotely what services and bandwidth that network element is already providing. Other indications can be given as to how the system can be extended, downgraded, or put into plan for other uses.

The present disclosure may be based on the ML system that provides that extra feasibility and functionality to make it easier for an operator to quickly determine the status of the node under certain circumstances as well as potentially better operate that node (e.g., network element within the network).

The systems and methods of the present disclosure do not necessarily need to replace existing inventory mechanisms that exist today, but instead can be an augmentation to the present systems. This can be made possible by utilizing monitoring equipment (e.g., cameras) that can be independent of the system (e.g., network element) actually being monitored. The independent system can operate in parallel to the system being monitored and may, in some embodiment, include no overlap or little overlap with existing equipment. The systems described in the present disclosure may be combined with existing systems used today to combine streams of information and utilize them together to get a more complete coverage of the inventory.

In one example, if network connectivity is lost to one or more devices, it may still be possible to have visibility through the independent cameras. The cameras can be used as a main source of the inventory for a certain duration of time when the connectivity to the devices is actually lost. As an augmentation monitoring system, it may be possible to achieve a broader coverage for different environmental conditions or situations.

Although some examples may be related to the loss of network connectivity, which may be monitored through conventional means (e.g., management systems), the present systems may also be configured, even without loss of connectivity, to perform some things that may normally be done only by a human operator today. With a human operator, however, the human may not always see every LED change when it first occurs. Also, with human interaction, certain accidents may occur, such as the accidental disconnection of fibers or the accidental pulling out or loosening of a plug from a fiber management system, which can be detrimental for future purposes of the monitored system. These extra things can also be detected by way of the present systems and methods, as opposed to just a conventional inventory system.

There are many possibilities for the detection of images or other visual representations. In some cases, a network element may have a cover that blocks the view of internal components. In some embodiments, video cameras within a facility may be configured to rotate to obtain a changing view of the network equipment being monitored.

The cameras may be just one example to catch the visual representation of those network elements in the data center. Also, these cameras can be arranged practically anywhere near or incorporated within the monitored system. In some cases, the shelving or the cabinets may cover certain parts of a network element that will determine the bandwidth or some type of service that the NE is carrying. However, even if a person were to be physically standing in front of a piece of hardware, the visual line of sight of the cameras may be impacted.

The ML algorithms of the inventory evaluation module 24 may be configured to analyze certain photographs or video of the network elements. From the images, the ML algorithms can, with very good accuracy, obtain considerable information from the node, as well as the actual shelving and closed cabinets. An object of the present disclosure does not necessarily include an attempt to design specific cameras or features of these cameras, but may rather include a strategy for setting up cameras as needed to observe certain useful visual information of the node. The ML system collects this image data and processes the images to analyze the inventory or equipment of the monitored node.

The ML systems and methods of the present disclosure further include reconciliation, which means that if the ML model is not accurate in its predictions, the system can fine-tune it by adding information with the images to clarify if a certain element is actually a filler card when it was originally identified as a non-filler card and/or if a certain element is actually a non-filler when it was originally identifies as a filler card. This information can be fed back to the ML model to train the model again and/or fine-tune the model as needed.

With a video feed, the incoming data can be associated with any specific network element. This relationship with that video feed can be established by training the model for keys and contexts, based off of diagrams with boxes that are labeled, such that it can infer, decide, or determine based on locations in the frame of the photo which network element the system is looking at.

The system does not prototype the object detection part of it, but a multi-class classification and binary concentration can be processed as a prototype, but not a bounding box. In that case, the system could use the CLLI information to associate that this camera feed is associated with a particular location, instead of using the IP address. Then, this information can be associated with specific network elements. For example, Common Language, Location Identifier (CLLI) can do that.

To prevent network element failure, a network element may have different hardware units on the node itself (e.g., fans that blow air through the backplane on the cards to keep them from overheating). One fan may slow down or not work. In this case, the shelf may be configured to shine an orange LED rather than red one or even stop illuminating any LEDs. However, the cooling effect may take a few second before anything is noticed. A visual display will need to be noticed to inform the operator. There are, of course, hardware and software electronics on the node as well to monitor the status of the hardware on that network element, which might play an important part. This is an example where this system could benefit from a proactive perspective.

In the context of losing communication with the network element, the video feed provides augmented information. Without someone going over and physically standing in front of that node or network element to see what the problem is, the indicators may not be noticed. However, depending on how that network element is configured, it may still have good connectivity with the network, but threshold alerts may be configured that no alarm or alert will be raised, yet the visual display will show the fault before any threshold alerts are raised. If not, a running node, which can be connected through TCP/IP, SNMP, or other connection, there are possibilities that it will potentially be used for other uses as well. However, a key feature for this is the augmenting or differentiating the fact that the node is not reachable, although it can be seen through the visual mechanisms.

The above use cases may start with very basic prototype to adjust to distinguish between filler and no-filler sub-units in the network equipment. Detecting the identity of a filler card from a non-filler card can essentially be done with 100% accuracy. In another use case, the system can also do this with "multi-vendor" equipment. In the third use case, the system is not prototyped, but the system is still able to detect the LED lights and other features like that. Use case #4 includes using a bounding box to actually not only detect if there is a filler card, but also to be able to tell, for example, that there are filler cards in specific slots on the shelf.

One thing to note is that the present systems have the ability to support different vendors or even equipment that may be developed in the future equipment without having to re-deploy software, particularly since the ML algorithms are able to teach the model with whatever images are available. Because of the learning aspect of the present disclosure, it is possible to simply update the ML model with new images and have the ML algorithm learn the new content. This is quite a significant difference from today's typical inventory mechanisms that require some hard-coded solution that needs to be regenerated or re-deployed.

The novel aspects of the present disclosure are based on the ability to utilize video feeds for automated methods to augment existing automated inventory methods and tools for coverage over a very broad range of conditions (e.g., loss of management communications) and augment existing planning methods and tools for determining future bandwidth capabilities based on the number of filler cards and their location. The present systems are also configured to support new (either future or another vendor's) card types with respect to inventory and planning without updating (rewriting/redeploying) the running software.

The present embodiments provide an image processing endpoint that submits a controlled set of images of hardware at a data center with the intent to perform self-learning. Also, the systems include the ability to re-submit an image that was wrongly predicted to determine whether the image can be correctly predicted. This detects the case where the model is being fine-tuned with a reconciliation feedback loop.

For a network element that is lacking in dying gasp feature but has an image capture source nearby, the present systems can perform a power cut to see if the system is operating according to design. The systems can observe if a surrogate dying gasp notification is given for that network element and can also be configured to continue to provide updates to the inventory system.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A non-transitory computer-readable medium configured to store computer logic having instructions that, when executed, cause one or more processing devices to perform the steps of:
    receiving visual representations of components in network elements in a network system;
    responsive to training a machine learning model to evaluate the visual representations, analyzing, the visual representations using the machine language model to determine a status of the components;
    recoding location information of each camera that captured the visual representations and determining the status of the components in part based on the location information; and
    providing the status of the components to an inventory application for any of updating the inventory application and reconciling existing data in the inventory application.

2. The non-transitory computer-readable medium of claim 1, wherein the steps further include
    performing the receiving and analyzing responsive to a loss of management communication to a network element.

3. The non-transitory computer-readable medium of claim 1, wherein the analyzing includes determining a number of filler cards in a network element, and wherein the steps further include
    determining bandwidth capabilities of the network element based on the number of filler cards.

4. The non-transitory computer-readable medium of claim 1, wherein the training includes
    receiving known visual representation of the components and labeling the known visual representation for training the machine learning model.

5. The non-transitory computer-readable medium of claim 1, wherein the status includes at least one of i) an operational status of the components, ii) a physical inventory of the network system, and iii) the presence or absence of sub-units of the components.

6. The non-transitory computer-readable medium of claim 1, wherein the components include any of Field Replaceable Units (FRUs), Power Supply Units (PSUs), pluggables, fans, cards, filler cards, various types of traffic carrying port cards, and Light Emitting Diodes (LEDs) indicating status or threshold conditions.

7. The non-transitory computer-readable medium of claim 1, wherein the steps further include
    performing an administrative action on a network element in response to the status of the respective components of the network element.

8. A method comprising the steps of:
- receiving visual representations of components in network elements in a network system:
- responsive to training a machine learning model to evaluate the visual representations, analyzing the visual representations using the machine language model to determine a status of the components;
- recoding location information of each camera that captured the visual representations and determining the status of the components in part based on the location information; and
- providing the status of the components to an inventory application for any of updating, the inventory application and reconciling existing data in the inventory application.

9. The method of claim 8, wherein the steps further include
- performing the receiving and analyzing responsive to a loss of management communication to a network element.

10. The method of claim 8, wherein the analyzing includes determining a number of filler cards in a network element, and wherein the steps further include
- determining bandwidth capabilities of the network element based on the number of filler cards.

11. The method of claim 8, wherein the training includes
- receiving known visual representation of the components and labeling the known visual representation for training the machine learning model.

12. The method of claim 8, wherein the status includes at least one of i) an operational status of the components, ii) a physical inventory of the network system, and iii) the presence or absence of sub-units of the components.

13. The method of claim 8, wherein the components include any of Field Replaceable Units (FRUs), Power Supply Units (PSUs), pluggables, fans, cards, filler cards, various types of traffic carrying port cards, and Light Emitting Diodes (LEDs) indicating status or threshold conditions.

14. The method of claim 8, wherein the steps further include
- performing an administrative action on a network element in response to the status of the respective components of the network element.

15. An inventory management system comprising:
- one or more processors and memory storing instructions that, when executed, cause the one or more processors to:
  - receive data related to inventory in a network system, wherein the network system includes a plurality of network elements each having components included therein;
  - store the data;
  - receive data, related to a status of any of the plurality of network elements, wherein the status is determined based on analyzing visual representations of the components using a machine language model; and
  - update the stored data and reconcile the stored data based on the status;
- wherein the analyzing includes recoding location information of each camera that captured the visual representations of the components and determining the status of the components in part based on the location information.

16. The inventory management system of claim 15, wherein the machine learning model is used responsive to a loss of management communication to a network element.

17. The inventory management system of claim 15, wherein the analyzing includes determining a number of filler cards in a network element, and wherein the instructions that, when executed, further cause the one or more processors to
- determine bandwidth capabilities of the network element based on the number of filler cards.

18. The inventory management system of claim 15, wherein the status includes at least one of i) an operational status of the components, ii) a physical inventory of the network system, and iii) the presence or absence of sub-units of the components.

* * * * *